United States Patent
Yang

(10) Patent No.: US 11,671,727 B2
(45) Date of Patent: Jun. 6, 2023

(54) IMAGE SENSING DEVICE AND IMAGING DEVICE INCLUDING THE SAME

(71) Applicant: SK hynix Inc., Icheon-si (KR)

(72) Inventor: Yun Hui Yang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/825,231

(22) Filed: May 26, 2022

(65) Prior Publication Data
US 2022/0417462 A1 Dec. 29, 2022

(30) Foreign Application Priority Data
Jun. 29, 2021 (KR) .................. 10-2021-0084888

(51) Int. Cl.
*H04N 25/767* (2023.01)
*H04N 25/63* (2023.01)
*H04N 25/633* (2023.01)
*H04N 25/71* (2023.01)

(52) U.S. Cl.
CPC .......... *H04N 25/767* (2023.01); *H04N 25/63* (2023.01); *H04N 25/633* (2023.01); *H04N 25/745* (2023.01)

(58) Field of Classification Search
CPC .... H04N 25/767; H04N 25/63; H04N 25/633; H04N 25/745
USPC ................................... 348/207.99
See application file for complete search history.

(56) References Cited

U.S. PATENT DOCUMENTS

| | | | |
|---|---|---|---|
| 7,787,033 B2 | 8/2010 | Rossi et al. | |
| 7,956,909 B2* | 6/2011 | Takahashi | H04N 25/60 |
| | | | 348/241 |
| 8,227,734 B2 | 7/2012 | Kameda | |
| 9,712,768 B2* | 7/2017 | Tani | H04N 25/677 |
| 2011/0199519 A1* | 8/2011 | Yamauchi | H04N 25/68 |
| | | | 348/244 |
| 2012/0241639 A1 | 9/2012 | Yagi et al. | |
| 2016/0173794 A1* | 6/2016 | Beck | H01L 27/14601 |
| | | | 348/244 |

* cited by examiner

*Primary Examiner* — Lin Ye
*Assistant Examiner* — Chan T Nguyen
(74) *Attorney, Agent, or Firm* — Perkins Coie LLP

(57) ABSTRACT

An image sensing device includes a first test block, a second test block, and a readout block. The first test block includes a plurality of first image sensing pixels structured to convert incident light carrying an image into a first pixel signal indicative of the image, and a first heating element structured to transmit heat to the first image sensing pixels. The second test block includes a plurality of second image sensing pixels that each include a light blocking structure to be shielded from receiving incident light to generate a second pixel signal without being directly exposed to the incident light, and a second heating element structured to transmit heat to the second image sensing pixels. The readout block processes the first pixel signal output from the first test block and the second pixel signal output from the second test block.

20 Claims, 9 Drawing Sheets

IMAGE SENSING DEVICE AND IMAGING DEVICE INCLUDING THE SAME

CROSS-REFERENCE TO RELATED APPLICATION

This patent document claims the priority and benefits of Korean patent application No. 10-2021-0084888, filed on Jun. 29, 2021, the disclosure of which is incorporated herein by reference in its entirety as part of the disclosure of this patent document.

TECHNICAL FIELD

The technology and implementations disclosed in this patent document generally relate to an image sensing device that generates image data in response to incident light, and an imaging device including the same.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various fields such as smart phones, digital cameras, game machines, IOT (Internet of Things), robots, security cameras and medical micro cameras.

The image sensing device may be roughly divided into CCD (Charge Coupled Device) image sensing devices and CMOS (Complementary Metal Oxide Semiconductor) image sensing devices. The CCD image sensing devices offer a better image quality, but they tend to consume more power and are larger in size as compared to the CMOS image sensing devices. The CMOS image sensing devices are smaller in size and consume less power than the CCD image sensing devices. Furthermore, CMOS sensors are fabricated using the CMOS fabrication technology, and thus photosensitive elements and other signal processing circuitry can be integrated into a single chip, enabling the production of miniaturized image sensing devices at a lower cost. For these reasons, CMOS image sensing devices are being developed for many applications including mobile devices.

SUMMARY

Various embodiments of the disclosed technology relate to an image sensing device that can reduce dark noise, and a imaging device including the same.

In an embodiment of the disclosed technology, an image sensing device may include a first test block including a plurality of first image sensing pixels structured to convert incident light carrying an image into a first pixel signal indicative of the image, and a first heating element structured to transmit heat to the first image sensing pixels; a second test block including a plurality of second image sensing pixels that each include a light blocking structure to be shielded from receiving incident light to generate a second pixel signal without being directly exposed to the incident light, and a second heating element structured to transmit heat to the second image sensing pixels; and a readout block configured to process the first pixel signal output from the first test block and the second pixel signal output from the second test block.

In another embodiment of the disclosed technology, an imaging device may include an image sensing device including a plurality of active image sensing pixels structured to convert incident light carrying an image into image data indicative of the image and a plurality of optical black pixels shielded from the incident light to generate noise data indicative of noise in the image data; and an image signal processor configured to: correct the noise data using pedestal information corresponding to a temperature of the image sensing device; and subtract the corrected noise data from the image data, wherein the image sensing device includes: a first test block including a plurality of first image sensing pixels structured to convert the incident light carrying the image into a first pixel signal indicative of the image, and a first heating element structured to transmit heat to the first image sensing pixels; a second test block including a plurality of second image sensing pixels that includes a light blocking structure to be shielded from receiving the incident light to generate a second pixel signal without being directly exposed to the incident light, and a second heating element structured to transmit heat to the second image sensing pixels; and a pedestal information storage circuit configured to store the pedestal information related to the first pixel signal of the first image sensing pixels and the second pixel signal of the second image sensing pixels.

In another embodiment of the disclosed technology, an image sensing device may include a first test block configured to include a plurality of active pixels, each of which generates a pixel signal corresponding to incident light, and a first heating element configured to transmit heat to the active pixels; a second test block configured to include a plurality of optical black pixels, each of which generates a pixel signal unrelated to the incident light, and a second heating element configured to transmit heat to the optical black pixels; and a readout block configured to process the pixel signal output from the first test block and the pixel signal output from the second test block.

In another embodiment of the disclosed technology, an imaging device may include an image sensing device configured to generate not only image data indicating a result of sensing incident light, but also noise data unrelated to the incident light, and an image signal processor configured to correct the noise data using pedestal information corresponding to a current temperature of the image sensing device, and to subtract the corrected noise data from the image data. The image sensing device may include a first test block configured to include a plurality of active pixels, each of which generates a pixel signal corresponding to the incident light, and a first heating element configured to transmit heat to the active pixels, a second test block configured to include a plurality of optical black pixels, each of which generates a pixel signal unrelated to the incident light, and a second heating element configured to transmit heat to the optical black pixels, and a pedestal information storage configured to store the pedestal information related to the pixel signals of the active pixels and the pixel signals of the optical black pixels.

It is to be understood that both the foregoing general description and the following detailed description of the disclosed technology are illustrative and explanatory and are intended to provide further explanation of the disclosure as claimed.

DETAILED DESCRIPTION

Figure 1:
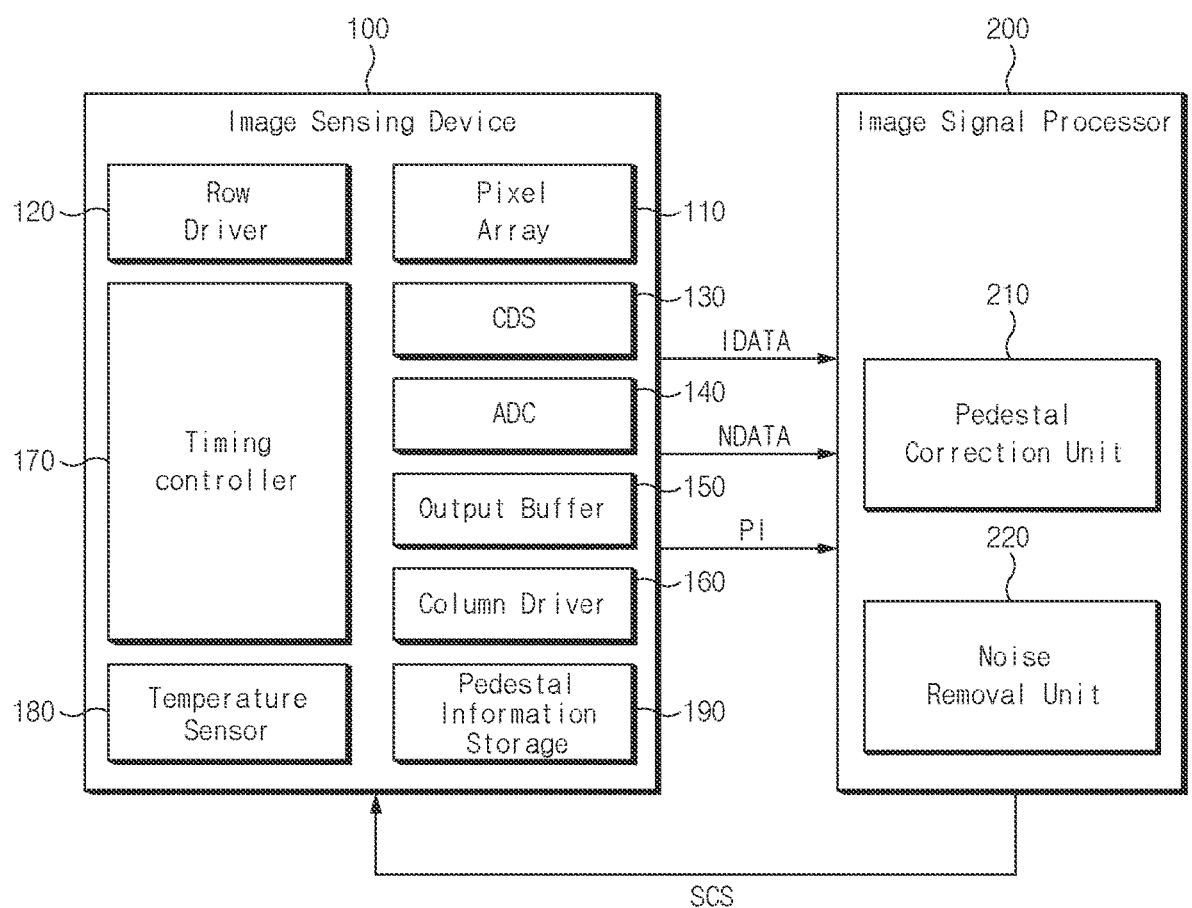
FIG. 1 is a block diagram illustrating an example of a imaging device based on some implementations of the disclosed technology.

This patent document provides implementations and examples of an image sensing device that can generate image data in response to incident light, and a imaging device including the same. The disclosed technology can be implemented in some embodiments to provide an image sensing device that can reduce dark noise under different conditions. In some implementations, an image sensing device includes a test block for generating pedestal information, allowing each image sensing device chip to store independent pedestal information to perform pedestal correction operations on a chip basis. In this way, dark noise components included in image data can be more accurately reflected in the image correction.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

FIG. 1 is a block diagram illustrating an example of a imaging device 10 based on some implementations of the disclosed technology.

Referring to FIG. 1, the imaging device 10 may include any mechanical or electronic devices that can take still or motion pictures such as a digital still camera for capturing still images or a digital video camera for capturing motion pictures. Examples of the imaging device may include a digital single lens reflex (DSLR) camera, a mirrorless camera, or a mobile phone (e.g., a smartphone), and others. The imaging device 10 may include a device having both a lens and an image pickup element such that the device can capture (or photograph) a target object and can thus create an image of the target object.

The imaging device 10 may include an image sensing device 100 and an image signal processor 200.

The image sensing device 100 may detect incident light and convert the incident light into charge carriers carrying an image in the incident light. Examples of the image sensing device 100 may include a complementary metal oxide semiconductor (CMOS) image sensor (CIS) for converting an optical signal into an electrical signal. The image sensing device 100 may provide the image signal processor 200 with image data (IDATA) obtained by converting the optical signal into the electrical signal. The image signal processor 200 may control operations of the image sensing device 100 using a sensor control signal (SCS), such as power on and off operations, operations for switching between different operation modes, operations for adjusting the sensitivity of the image sensing device 100.

The image sensing device 100 may include a pixel array 110, a row driver 120, a correlated double sampler (CDS) 130, an analog-to-digital converter (ADC) 140, an output buffer 150, a column decoder 160, a timing controller 170, a temperature sensor 180, and a pedestal information storage 190. The components of the image sensing device 100 illustrated in FIG. 1 are discussed by way of example only and not to be construed as a limitation. Thus, the image sensing device 100 may further include other components that are illustrated in FIG. 1.

The pixel array 110 may include a plurality of unit pixels (e.g., unit imaging pixels or unit image sensing pixels) arranged in rows and columns. In one example, the plurality of unit pixels can be arranged in a two dimensional (2D) pixel array including rows and columns. In another example, the plurality of unit pixels can be arranged in a three dimensional (3D) pixel array.

The plurality of unit pixels may generate an electrical signal on a unit pixel basis or a pixel group basis, where a pixel group includes a plurality of unit pixels that can share at least certain internal circuitry.

The plurality of unit pixels may include at least one active pixel and at least one optical black (OB) pixel. The active pixels may sense incident light and generate a pixel signal corresponding to the intensity of the incident light. The optical black pixels may have substantially the same structure as the active pixels except for a structure for blocking the incident light. The optical black pixels are shielded from receiving light incident upon the surface of the optical black pixel and be used to generate a pixel signal without being exposed to the incident light. The pixel output signals from optical black pixels are used to reduce noise in the image generated by the active pixels.

The pixel array 110 may receive driving signals, including a row selection signal, a pixel reset signal and a transmission signal, from the row driver 120. Upon receiving the driving signal, corresponding imaging pixels in the pixel array 110 may be activated to perform the operations corresponding to the row selection signal, the pixel reset signal, and the transmission signal.

The row driver 120 may activate the pixel array 110 to perform certain operations on the imaging pixels in the corresponding row based on commands and control signals provided by controller circuitry such as the timing controller 170. In some implementations, the row driver 120 may select one or more imaging pixels arranged in one or more rows of the pixel array 110. The row driver 120 may generate a row selection signal to select one or more rows among the plurality of rows. The row decoder 120 may sequentially enable the pixel reset signal for resetting imaging pixels corresponding to at least one selected row, and the transmission signal for the pixels corresponding to the at least one selected row. Thus, a reference signal and an image signal, which are analog signals generated by each of the imaging pixels of the selected row, may be sequentially transferred to the CDS 130. The reference signal may be an electrical signal that is provided to the CDS 130 when a sensing node of an imaging pixel (e.g., floating diffusion node) is reset, and the image signal may be an electrical signal that is provided to the CDS 130 when photocharges generated by the imaging pixel are accumulated in the sensing node. The reference signal indicating unique reset noise of each pixel and the image signal indicating the intensity of incident light may be collectively referred to as a pixel signal as necessary.

CMOS image sensors may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured. In some embodiments of the disclosed technology, the CDS 130 may sequentially sample and hold voltage levels of the reference signal and the image signal, which are provided to each of a plurality of column lines from the pixel array 110. That is, the CDS 130 may sample and hold the voltage levels of the reference signal and the image signal which correspond to each of the columns of the pixel array 110.

In some implementations, the CDS 130 may transfer the reference signal and the image signal of each of the columns as a correlate double sampling signal to the ADC 140 based on control signals from the timing controller 170.

The ADC 140 is used to convert analog CDS signals into digital signals. In some implementations, the ADC 140 may generate digital signals by comparing analog signals to reference signals such as ramp signals. Such an ADC may include a comparator circuit and a timer. The comparator may compare the analog pixel signal with a reference signal such as a ramp signal that ramps up or down, and the timer counts until a voltage of the ramp signal matches the analog pixel signal. In some embodiments of the disclosed technology, the ADC 140 may convert the correlate double sampling signal generated by the CDS 130 for each of the columns into a digital signal, and output the digital signal. The ADC 140 may perform a counting operation and a computing operation based on the correlate double sampling signal for each of the columns and a ramp signal provided from the timing controller 170. In this way, the ADC 140 may eliminate or reduce noises such as reset noise arising from the imaging pixels when generating digital image data.

The ADC 140 may include a plurality of column counters. Each column of the pixel array 110 is coupled to a column counter, and image data (IDATA) and noise data (NDATA) can be generated by converting the correlate double sampling signals received from each column into digital signals using the column counter. In another embodiment of the disclosed technology, the ADC 140 may include a global counter to convert the correlate double sampling signals corresponding to the columns into digital signals using a global code provided from the global counter. Here, the image data (IDATA) may include a digital signal generated from a pixel signal that is generated by the active pixels, and the noise data (NDATA) may include a digital signal generated from a pixel signal that is generated by the optical black pixels.

The output buffer 150 may temporarily hold the column-based image data (IDATA) and noise data (NDATA) provided from the ADC 140 to output the image data. In one example, the image data (IDATA) and noise data (NDATA) provided to the output buffer 150 from the ADC 140 may be temporarily stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer upon receiving a control signal from the timing controller 170, and sequentially output the image data (IDATA) and the noise data (NDATA), which are temporarily stored in the selected column of the output buffer 150. In some implementations, upon receiving an address signal from the timing controller 170, the column driver 160 may generate a column selection signal based on the address signal and select a column of the output buffer 150, so that the image data (IDATA) and the noise data (NDATA) from the selected column of the output buffer 150 can be output to the image signal processor 200 as output signals.

In some implementations, a readout block is configured to convert the pixel signal into a digital signal, and store or output the digital signal. In one example, the readout block may include the CDS 130, the ADC 140, the output buffer 150, and the column driver 160.

The timing controller 170 may control operations of the row driver 120, the ADC 140, the output buffer 150, the column driver 160, a temperature sensor 180, and a pedestal information storage 190.

The timing controller 170 may provide a clock signal, a control signal for timing control, and address signals for selecting a row or column to circuitry in the imaging device 10, such as the row driver 120, the CDS 130, the ADC 140, the output buffer 160, the column driver 160, the output buffer 150, the temperature sensor 180, and the pedestal information storage 190. In an embodiment of the disclosed technology, the timing controller 170 may include a logic control circuit, a phase lock loop (PLL) circuit, a timing control circuit, a communication interface circuit and others.

In some implementations, the timing controller 170 may receive temperature information from the temperature sensor 180 in response to a sensor control signal (SCS) of the image signal processor 200, and may read out pedestal information (PI) corresponding to the received temperature information from the pedestal information storage 190. In one example, the temperature information may indicate the temperature measured by the temperature sensor 180. The timing controller 170 may transmit the pedestal information (PI) as a response to the sensor control signal (SCS) to the image signal processor 200. The pedestal information (PI) may include values that are used for pedestal correction operations that are performed by the image signal processor 200.

The image data (IDATA) may include dark noise components that result from a dark current that is generated by a pixel without being exposed to any incident light. The dark current can be generated due to the structural characteristics of the image sensor and/or the surrounding conditions of the image sensors, other than the incident light. For example, a dangling bond of the silicon atom with four valence electrons at the surface of the substrate may bond to a moving positive charge that is not generated by incident light as part of the dark current. In more detail, electric charges that are created by something other than interactions with the incident light are transferred to a sensing region (e.g., a floating diffusion (FD) region) of each pixel through the dark current, so that dark noise components (noise unrelated to the incident light) may be included in image data (IDATA). Since the dark noise components adversely affect the image quality, the dark noise components should be removed using noise data (NDATA) generated from the optical black (OB) pixel provided with the structure for blocking incident light.

The disclosed technology can be implemented in some embodiments to provide the noise data (NDATA) with the same value as the dark noise components of the image data (IDATA), thereby more completely removing the dark noise components of the image data (IDATA).

Figure 2:
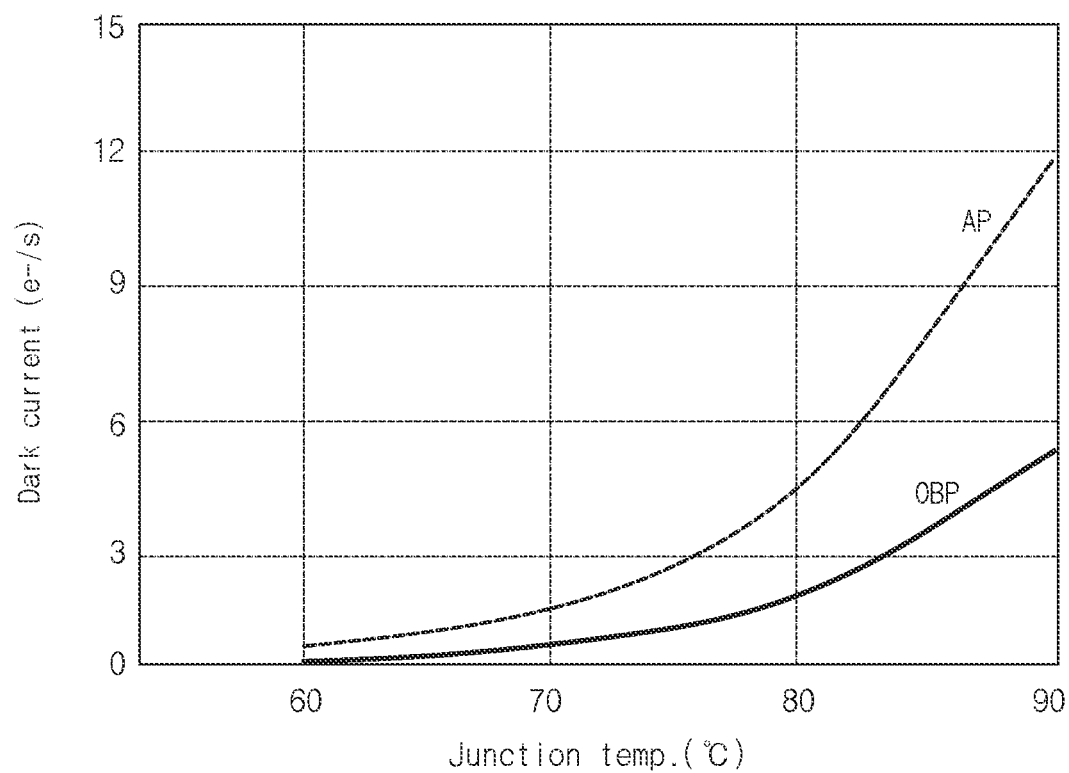
FIG. 2 is a graph illustrating increases in the dark current of an active pixel and an optical black pixel resulting from temperature increases based on some implementations of the disclosed technology.

FIG. 2 is a graph illustrating an example of the increase in the dark current (e-/s; electron charge per second) of the active pixel and the optical black (OB) pixel resulting from the increasing temperature.

The dark current of the active pixel may indicate dark noise components of the image data (IDATA), and the dark current of the optical black pixel may indicate noise data (NDATA). Referring to FIG. 2, the dark current of the active pixel has different values from the dark current of the optical black pixel. As a junction temperature of the substrate on which pixels are formed increases (e.g., from 60° C. to 90° C.), a difference between the dark current of the active pixel and the dark current of the optical black pixel may also increase.

When removing dark noise components of the image data (IDATA) by using the noise data (NDATA) without taking into account the above difference in the dark current, there is a possibility that the dark noise components of the image data (IDATA) may not be sufficiently removed. Thus, in some embodiments of the disclosed technology, a pedestal correction is performed so that the noise data (NDATA) is corrected to have a level that is equivalent to the level of the dark noise components of the image data (IDATA). In this way, the corrected noise data (NDATA) accurately reflects the dark noise components of the image data IDATA) and thus can be used to remove the dark noise from the image data.

Referring back to FIG. 1, the pedestal correction may be performed using pedestal information (PI) at a corresponding temperature. The pedestal information (PI) can include different values that can be mapped to different temperatures so that the noise data (NDATA) is corrected according to the corresponding temperature so that the corrected noise data (NDATA) can accurately reflect the dark noise components of the image data (IDATA). In some implementations, pedestal information (PI) for a certain image sensor may change with temperature, and may include a pedestal correction value that can be used to correct the noise data (NDATA) based on the temperature. In some implementations, the timing controller 180 may read out pedestal information (PI) stored in association with temperature information from the pedestal information storage 190, and may transmit the read pedestal information (PI) to the image signal processor 200.

In some implementations, the pedestal information (PI) may include a pedestal correction value that is independently determined for each color (e.g., R/G/B colors) of the active pixel. There may be structural differences between active pixels that include one color filter and pixels that include another color filter (e.g., optical filters in different colors or different types of color filters may have different structures from one another). Therefore, the difference between the dark current of the active pixel and the dark current of the optical black pixel in the same color may vary even at the same temperature. The disclosed technology can be implemented in some embodiments to perform the pedestal correction using a pedestal correction value that is independently determined for each color, so that the dark noise components of the image data (IDATA) can be more precisely removed. In some implementations, the temperature may include a temperature of the substrate in which the pixel array 110 is arranged.

Referring back to FIG. 1, the temperature sensor 180 may measure a temperature of the image sensing device 100 based on commands and control signals of the timing controller 170. The temperature sensor 180 may generate temperature information that includes the measured temperature, and may transmit the generated temperature information to the timing controller 170. In some implementations, the temperature sensor 180 may measure a temperature of the substrate in which the pixel array 110 is disposed.

The pedestal information storage 190 may store pedestal information (PI) corresponding to each of the plurality of temperatures. In some implementations, when a temperature of a portion of the substrate is within the plurality of temperatures, the pedestal correction is performed. In some implementations, pedestal information (PI) corresponding to each temperature may include a pedestal correction value for each color. The pedestal information (PI) may be experimentally determined during a testing operation. The pedestal information storage 190 may store pedestal information (PI) using a memory device such as One-Time Programmable (OTP) memory included therein.

Although FIG. 1 illustrates that the temperature sensor 180 and the pedestal information storage 190 are included in the image sensing device 100, at least one of the temperature sensor 180 and the pedestal information storage 190 can also be located outside the image sensing device 100. For example, at least one of the temperature sensor 180 and the pedestal information storage 190 may also be included in the image signal processor 200.

The image signal processor 200 may process image data (IDATA) received from the image sensing device 100, and may control the image sensing device 100 based on output signals of the image signal processor 200 or other commands and/or control signal received from an external device.

The image signal processor 200 may reduce noise in image data (IDATA), and may perform image signal processing operations (e.g., gamma correction, color filter array interpolation, color matrix, color correction, color enhancement, etc.) on the image data (IDATA) to improve the image-quality of the image data (IDATA). In addition, the image signal processor 200 may compress image data (IDATA) created by the image signal processing operations, such that the image signal processor 500 can create an image file using the compressed image data. Alternatively, the image signal processor 200 may recover image data (IDATA) from the image file. Here, the image data (IDATA) may be compressed using a reversible compression technique or an irreversible compression technique. In one example, still images may have a compressed image file format such as Joint Photographic Experts Group (JPEG) format or JPEG 2000 format. In one example, moving images may have a compressed video file format such as Moving Picture Experts Group (MPEG) standards such that moving image files can be created by compressing a plurality of frames. In another example, the image files may be created according to Exchangeable image file format (Exif) standards.

The image data (IDATA) generated from the image signal processor 200 may be stored in an internal memory of the imaging device 10 or an external memory either in response to a user request or autonomously, such that still images or videos corresponding to the stored image data (IDATA) can be viewed through a display device.

In addition, the image signal processor 500 may perform operations for removing unclear or blurry portions from the images or videos, edge emphasis processing, image analysis processing, image recognition processing, image effect processing, or other operations for improving the image quality.

In addition, the image signal processor 200 may perform display image signal processing operations for the display. For example, the image signal processor 200 may perform brightness level adjustment, color correction, contrast adjustment, outline emphasis adjustment, screen division processing, character image generation, and image synthesis processing.

The image signal processor 200 may include a pedestal correction unit 210 and a noise removal unit 220.

The pedestal correction unit 210 may request pedestal information (PI) from the image sensing device 100 using the sensor control signal (SCS), and may receive the pedestal information (PI) corresponding to a current temperature from the image sensing device 100.

The pedestal information (PI) may include a pedestal correction value as correction information for correcting noise data (NDATA) in a manner that the noise data (NDATA) is adjusted to a data level or value equivalent to the dark noise components of the image data (IDATA) (or the noise data NDATA) and the corrected noise data (NDATA) can indicate the dark noise components of the image data (IDATA). The pedestal correction value may include a ratio (e.g., 1.8) between the dark current of the active pixel corresponding to a specific color (e.g., red) at a specific temperature (e.g., 80°) and the dark current of the optical black pixel corresponding to the same color (e.g., red) as the specific color at the specific temperature (e.g., 80°). The pedestal correction unit 210 may calculate the pedestal correction value (e.g., 1.8) corresponding to the same color (e.g., red) for the noise data (NDATA) corresponding to a specific color (e.g., red), and may perform pedestal correction in which the noise data (NDATA) is adjusted to a data level equivalent to the dark noise components of the image data (IDATA). For example, the above-mentioned calculation (or operation) may be calculation (or operation) of multiplying the pedestal correction value by the noise data (NDATA), other implementations are also possible. In addition, the pedestal correction may be performed independently for each color.

The noise removal unit 220 may receive pedestal-corrected noise data for each color from the pedestal correction unit 210 and remove the dark noise components of the image data (IDATA) corresponding to a specific color (e.g., red) using the pedestal-corrected noise data corresponding to the same color (e.g., red). In some implementations, the dark noise components of the image data (IDATA) may be removed by subtracting the pedestal-corrected noise data from the image data (IDATA).

Figure 3:
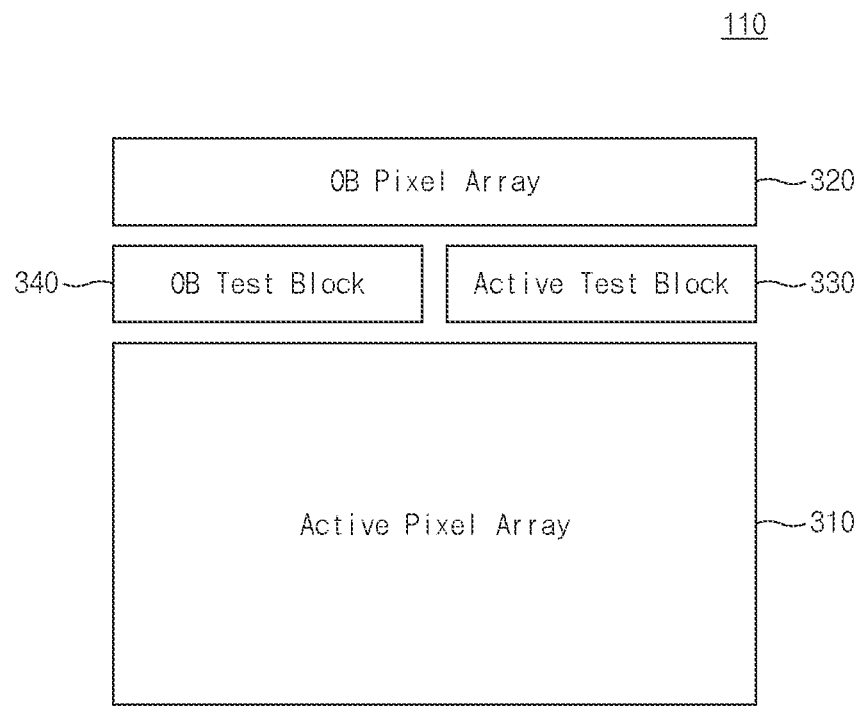
FIG. 3 is a block diagram illustrating an example of the pixel array shown in FIG. 1 based on some implementations of the disclosed technology.

FIG. 3 is a block diagram illustrating an example of the pixel array 110 shown in FIG. 1 based on some implementations of the disclosed technology.

Referring to FIG. 3, the pixel array 110 may include an active pixel array 310, an optical black (OB) pixel array 320, an active test block 330, and an optical black (OB) test block 340.

In an implementation, the optical black (OB) pixel array 320 is arranged along one side of the pixel array 110 and the active pixel array 310 is arranged along the other side of the pixel array 110. The optical black (OB) test block 340 and the active test block 330 are arranged between the optical black (OB) pixel array 320 and the active pixel array 310.

The active test block 330 may be disposed at one side (e.g., a lower side) of the active pixel array 310, and the optical black (OB) test block 340 may be disposed at the other side (e.g., an upper side) of the optical black (OB) pixel array 320.

The structures, positions and sizes of the active pixel array 310, the optical black (OB) pixel array 320, the active test block 330, and the optical black (OB) test block 340 are discussed by way of example only.

The active pixel array 310 may include active pixels structured to be exposed to incident light and convert received incident light to electrical signals such as pixel signals to capture images in the incident light as the primary image sensing pixel array.

The optical black (OB) pixel array 320 may include optical black (OB) pixels that are structured to be shielded from incident light so that incident light cannot reach the pixels in the OB pixel array 320 and the pixels in the OB pixel array 320 generate pixel signals represents the pixel responses without the incident light.

The active test block 330 may include active pixels (or first image sensing pixels) that have structures identical or similar to the active pixels in the active pixel array 310. The active test block 330 may also include additional structures for controlling the temperature of the active pixels in the active test block 330. The active test block 330 may be used to obtain a measurement of a dark current of the active pixels in the active test block 330 for each color at a set temperature during the testing operation of the image sensing device.

The optical black (OB) test block 340 may include optical black (OB) pixels (or second image sensing pixels) and structures for controlling the temperature of the optical black (OB) pixels. The optical black (OB) test block 340 may be used to obtain dark current of the optical black (OB) pixel for each color at a set temperature during the testing operation.

The active test block 330 will hereinafter be referred to as a first test block, and the optical black (OB) test block 340 will hereinafter be referred to as a second test block.

Figure 4A:
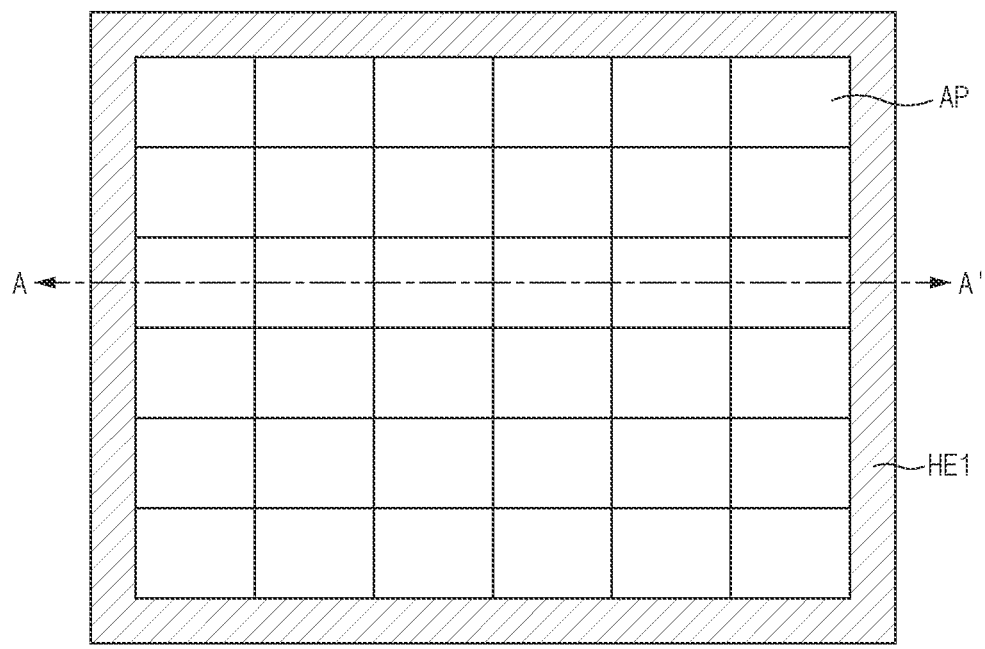
FIG. 4A is a schematic diagram illustrating an example of an active test block shown in FIG. 3 based on some implementations of the disclosed technology.
Figure 4B:
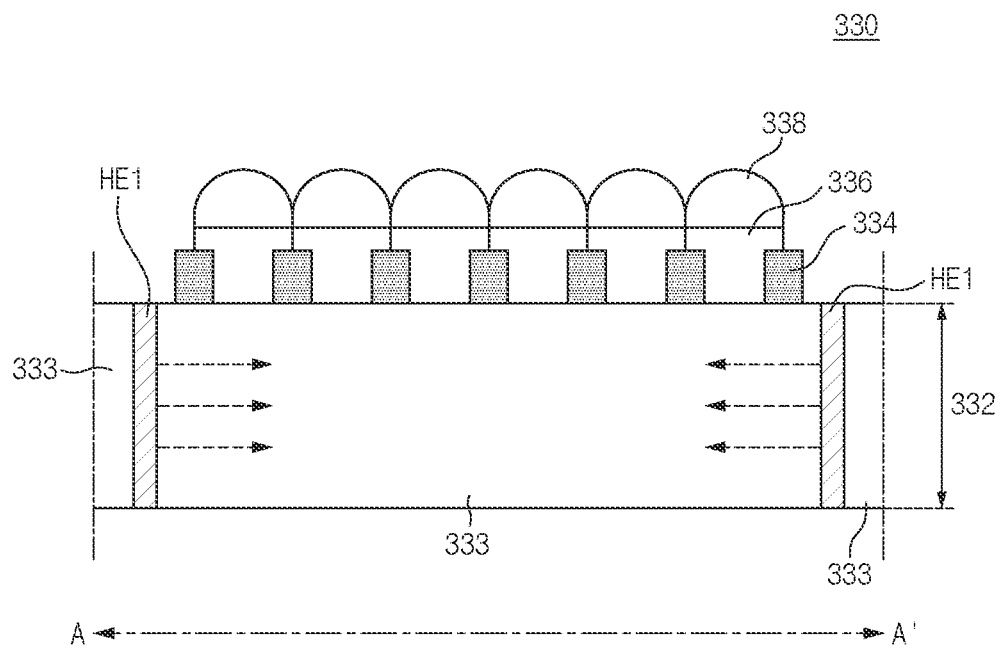
FIG. 4B is a cross-sectional view illustrating an example of the active test block taken along a first cutting line shown in FIG. 4A based on some implementations of the disclosed technology.

FIG. 4A is a schematic diagram illustrating an example of the active test block shown in FIG. 3 based on some implementations of the disclosed technology. FIG. 4B is a cross-sectional view illustrating an example of the active test block taken along the first cutting line shown in FIG. 4A based on some implementations of the disclosed technology.

Referring to FIG. 4A, the active test block 330 may include a plurality of active pixels (AP) and a first heating element (HE1).

The plurality of active pixels (AP) may be arranged in a matrix array. Although FIG. 4A illustrates a (6×6) matrix array including six rows and six columns, the numbers of rows and columns may vary. In some implementations, each active pixel (AP) may have substantially the same structure as the active pixel included in the pixel array 310 shown in FIG. 3.

The first heating element (HE1) may be used to control the temperature of the plurality of active pixels (AP) in response to a heating control signal from a test device (not shown) during the testing operation. The first heating element (HE1) may generate heat corresponding to the heating control signal and transmit the heat to the plurality of active pixels (AP). That is, the first heating element (HE1) may set the temperature of the active pixels (AP) to a temperature corresponding to the heating control signal. To this end, the image sensing device 100 may include a terminal (not shown) configured to receive the heating control signal from the test device. Here, the terminal may be electrically coupled to the first heating element (HE1) to transmit the heating control signal to the first heating element (HE1).

In an implementation, the first heating element (HE1) may be arranged to surround or enclose the plurality of active pixels (AP) and structured to transfer heat to the plurality of active pixels (AP). In another implementation, the first heating element (HE1) may include any shape that is structured to transfer heat to the plurality of active pixels (AP).

FIG. 4B is a cross-sectional view illustrating the active test block 330 taken along the first cutting line A-A' shown in FIG. 4A based on some implementations of the disclosed technology. As can be seen from the cross-sectional view of the active test block 330 shown in FIG. 4B, the active test block 330 may include a substrate 332, an array of active pixels APs supported by the substrate where each active pixel AP is operable to respond to incident light to produce electrical charge, an optical grid structure 334 supported by the substrate 332 to divide the space over the substrate 334 into periodic regions overlapping with the array of active pixels APs, an array of optical filters 336 that correspond to the array of APs to filter incident light to the APs, respectively, an array of microlenses 338 that correspond to the array of APs, respectively, to direct incident light into the APs, respectively, and a first heating element (HE1).

The substrate 332 may include a top surface and a bottom surface. Although the top surface of the substrate 332 can be defined as a front side and the bottom surface of the substrate 332 can be defined as a back side for convenience of description. For example, the substrate 332 may include a P-type or N-type bulk substrate, a substrate formed by growing a P-type or N-type epitaxial layer on the P-type bulk substrate, or a substrate formed by growing a P-type or N-type epitaxial layer on the N-type bulk substrate. The substrate 332 may include a P-type or N-type doped region 333 having P-type or N-type conductive impurities.

The P-type or N-type doped region 333 may include a photoelectric conversion region (not shown) that is disposed in a region of the substrate 332 corresponding to the active pixel AP. The photoelectric conversion region may be formed as an N-type doped region through ion implantation of N-type ions. In some implementations, the photoelectric conversion region may be formed by stacking a plurality of doped regions. In some implementations, a lower doped region may be formed by implanting N+ ions, and an upper doped region may be formed by implanting N− ions. The photoelectric conversion region may be structured to have a region that is large enough to increase or maximize a fill factor indicating light reception (Rx) efficiency. In some implementations, a device isolation layer (not shown) disposed between the photoelectric conversion regions of the adjacent active pixels (AP) may be formed by performing an etching process in a vertical direction, so that the device isolation layer can electrically or optically isolate adjacent pixels from each other.

The photoelectric conversion region may generate and accumulate photocharges corresponding to the intensity of incident light. Photocharges accumulated in the photoelectric conversion region may be converted into a pixel signal corresponding to an electrical signal through a separate pixel signal circuit. For example, the pixel signal circuit may include transfer (Tx) transistor, a floating diffusion region, a reset transistor, a source follower transistor, and a selection transistor of a 4-transistor (4T) pixel.

The optical grid structure 334 may prevent optical crosstalk between the active pixels (AP) adjacent to each other. That is, the optical grid structure 334 may prevent light incident upon the optical filter 336 of one active pixel (AP) from propagating toward the optical filter 336 of another adjacent active pixel (AP). To this end, the optical grid structures 334 may be disposed along a boundary between the adjacent active pixels (AP), and may include a shielding material that can be used to block light. For example, the optical grid structure 334 may include tungsten (W) having a high light absorption rate.

The optical filter 336 may be formed over the substrate 332, and may selectively transmit a light signal (e.g., red light, green light, blue light, magenta light, yellow light, cyan light) having a specific wavelength. Each active pixel (AP) may be distinguished by the color of its optical filter 336. For example, a "red" active pixel (AP) includes a "red" optical color filter that allows only red light to pass through, a "green" active pixel (AP) includes a "green" optical color filter 336 that allows only green light to pass through, and a "blue" active pixel (AP) includes a "blue" optical color filter 336 that allows only blue light to pass through.

The microlens 338 may be formed over the optical filter 336, and may increase light gathering power of incident light, resulting in increased light reception (Rx) efficiency of the photoelectric conversion region included in each active pixel (AP). Although FIG. 4B illustrates that each active pixel AP includes one microlens 338, each active pixel AP may include more than one microlens or no microlens. For example, a plurality of phase detection autofocus (PDAF) pixels can share one microlens.

The first heating elements (HE1) may be disposed at right and left sides of six active pixels (AP). The first heating elements (HE1) may be disposed in the substrate 332 to transfer heat to the doped region 333 in which the dark current occurs.

In some implementations, each of the first heating elements (HE1) may include a thermoelectric element structured to absorb heat at one surface thereof and generate heat at the other surface thereof based on the Peltier effect according to the direction of a current generated when a voltage is applied to both ends of different elements. As such, each of the first heating elements (HE1) may include a heat absorption surface and a heating surface. The heating surface may be disposed at a location close to the active pixels (AP) to transfer heat to the active pixels (AP) more effectively. For example, the left surface of the first heating element (HE1) disposed at the left side of the active test block 330 may be a heat absorption surface, and the right surface of the first heating element (HE1) disposed at the right side of the active test block 330 may be a heating surface.

The first heating element (HE1) may generate heat corresponding to the heating control signal and transmit the heat to the plurality of active pixels (AP). When the first heating element (HE1) includes a thermoelectric element, the heating control signal may include voltages that are applied to both ends of the first heating element (HE1). Here, the voltage applied to one end of the first heating element (HE1) may be different from the voltage applied to the other end of the first heating element (HE1), and the voltage difference between the two voltages may be predetermined so that the heat absorption surface and the heating surface of the first heating element (HE1) can be fixed.

In addition, a difference between voltages applied to both ends of the first heating element (HE1) may determine the current flowing in the first heating element (HE1). For example, as the current flowing in the first heating element (HE1) increases, the heat generated from the heating surface may also increase. As the current flowing in the first heating element (HE1) decreases, the heat generated from the heating surface may also decrease. That is, a test device (not shown) may control the temperature of the first heating element (HE1) by controlling the heating control signal. Thereafter, as the first heating element (HE1) and the active pixels (AP) reach thermal equilibrium, temperatures of the plurality of active pixels (AP) can be controlled.

Figure 5A:
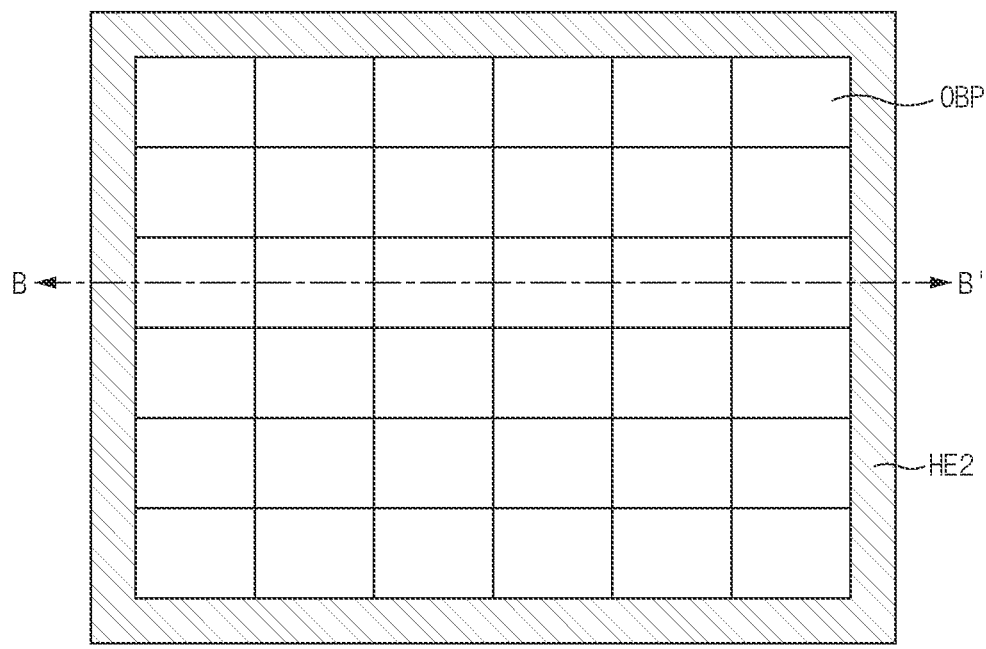
FIG. 5A is a schematic diagram illustrating an example of an optical black (OB) test block shown in FIG. 3 based on some implementations of the disclosed technology.
Figure 5B:
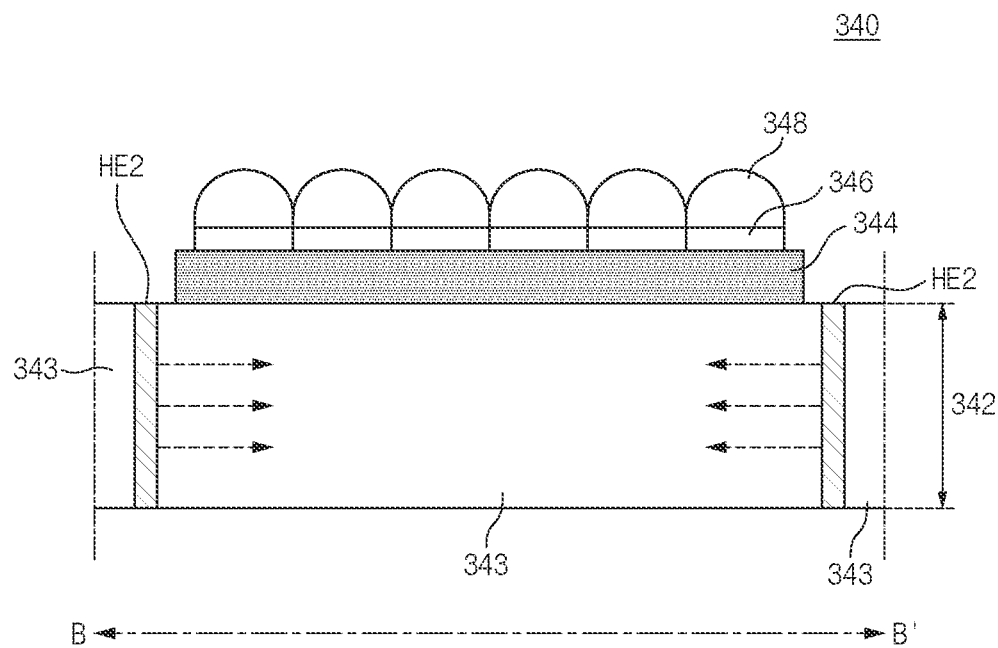
FIG. 5B is a cross-sectional view illustrating an example of the optical black (OB) test block taken along a second cutting line shown in FIG. 5A based on some implementations of the disclosed technology.

FIG. 5A is a schematic diagram illustrating an example of the optical black (OB) test block shown in FIG. 3 based on some implementations of the disclosed technology. FIG. 5B is a cross-sectional view illustrating an example of the optical black (OB) test block taken along the second cutting line shown in FIG. 5A based on some implementations of the disclosed technology.

Referring to FIG. 5A, the optical black (OB) test block 340 may include a plurality of optical black pixels (OBP) and a second heating element (HE2).

The plurality of optical black pixels (OBP) may be arranged in a matrix array. Although FIG. 5A illustrates that the optical black pixels (OBP) are arranged in a (6×6) matrix array including six rows and six columns, the numbers of rows and columns may vary. In some implementations, each optical black pixel (OBP) may be substantially identical in structure to the optical black pixel included in the optical black pixel array 320 shown in FIG. 3.

The second heating element (HE2) may be used to control the temperature of the plurality of optical black pixels (OBP) in response to the heating control signal from the test device (not shown) during the testing operation. The second heating element (HE2) may generate heat corresponding to the heating control signal, and may transmit the generated heat to the plurality of optical black pixels (OBPs). That is, the second heating element (HE2) may set the temperature of the optical black pixels (OBP) to a temperature corresponding to the heating control signal. To this end, the image sensing device 100 may include a terminal (not shown) configured to receive the heating control signal from the test device. The terminal may be electrically coupled to the second heating element (HE2), so that the heating control signal can be transmitted to the second heating element (HE2) through the terminal.

In an implementation, the second heating element (HE2) may be arranged to surround or enclose the plurality of optical black pixels (OBP) and structured to transfer heat to the optical black pixels (OBP). In another implementation, the second heating element (HE2) may include any shape that is structured to transfer heat to the plurality of optical black pixels (OBP).

FIG. 5B is a cross-sectional view illustrating the optical black test block 340 taken along the second cutting line B-B' shown in FIG. 5A based on some implementations of the disclosed technology. As can be seen from the cross-sectional view of the optical black test block 340 shown in FIG. 5B, the optical black test block 340 may include a substrate 342, a light blocking structure 344, an optical filter 346, a microlens 348, and a second heating element (HE2).

In some implementations, the substrate 342 and the microlens 348 shown in FIG. 5B may have an identical or similar structure to the substrate 332 and the microlens 338 shown FIG. 4B.

Unlike the optical grid structure 334 shown in FIG. 4B, the light blocking structure 344 shown in FIG. 5B may be disposed over the entire region of the optical black pixel (OBP), so that the light blocking structure 344 is shielded from light incident thereupon and the light is not transferred to the substrate 342.

The light blocking structure 344 may include a shielding material that can be used to block light. For example, the light blocking structure 344 may include tungsten (W) having a high light absorption rate. The light blocking structure may be formed through the same process as the optical grid structure 334.

Unlike the optical filter 336 shown in FIG. 4B, the optical filter 346 may be disposed over the light blocking structure 344 instead of a region disposed between the adjacent optical grid structures 334. Each optical black pixel (OBP) may be identified by the optical filter 346 included therein. For example, a "red" optical black pixel (OBP) includes a "red" optical color filter 346 that allows only red light to pass through, a "green" optical black pixel (OBP) includes a "green" optical color filter 346 that allows only green light to pass through, and a "blue" optical black pixel (OBP) includes a "blue" optical color filter 346 that allows only blue light to pass through.

The remaining components of the optical filter 346 may have identical or similar structures to those of the optical filter 336.

The second heating elements (HE2) may be disposed at right and left sides of six optical black pixels (OBP). The second heating elements (HE2) may be disposed in the substrate 342 to transfer heat to the doped region 343 in which the dark current occurs.

In some implementations, each of the second heating elements (HE2) may include a thermoelectric element. At this time, each of the second heating elements (HE2) may include a heat absorption surface and a heating surface. The heating surface may be disposed toward the optical black pixels (OBP), so that heat can be well transferred to the optical black pixels (OBP). For example, the left surface of the second heating element (HE2) disposed at the left side of the optical black test block 340 may be a heat absorption surface, and the right surface of the second heating element (HE2) disposed at the right side of the optical black test block 340 may be a heating surface.

The second heating element (HE2) may generate heat corresponding to the heating control signal and transmit the heat to the plurality of optical black pixels (OBP). When the second heating element (HE2) includes a thermoelectric element, the heating control signal may include voltages applied to both ends of the second heating element (HE2). Here, the voltages applied to one end of the second heating element (HE2) may be different from the voltage applied to the other end of the second heating element (HE2), and the voltage difference between the two voltages may be predetermined so that the heat absorption surface and the heating surface of the second heating element (HE2) can be fixed.

In addition, a difference between voltages applied to both ends of the second heating element (HE2) may determine the current flowing in the second heating element (HE2). For example, as the current flowing in the second heating element (HE2) increases, the heat generated from the heating surface may also increase. As the current flowing in the second heating element (HE2) decreases, the heat generated from the heating surface may also decrease. That is, a test device (not shown) may control the temperature of the second heating element (HE2) by controlling the heating control signal. Thereafter, as the second heating element (HE2) and the optical black pixels (OBP) reach thermal equilibrium, temperatures of the plurality of optical black pixels (OBP) can be controlled.

Figure 6:
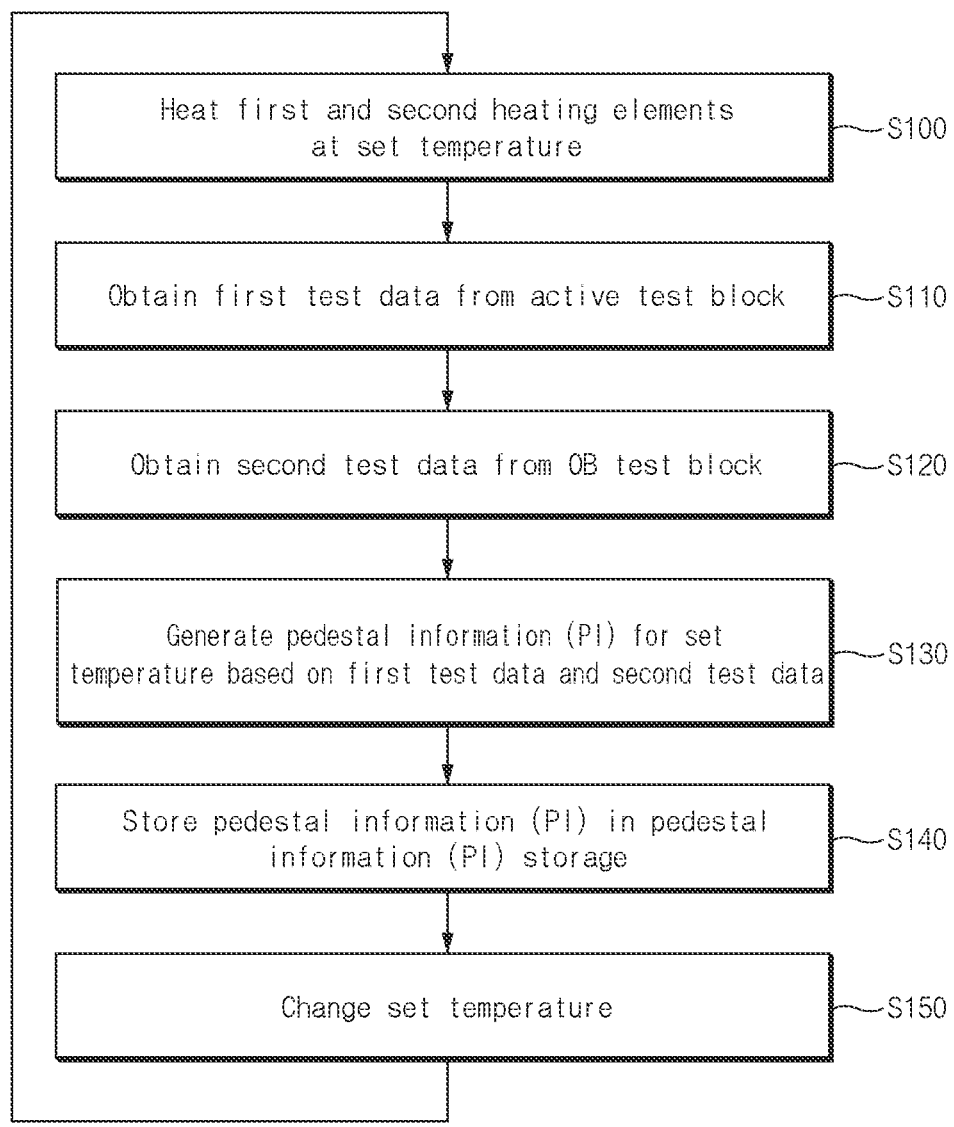
FIG. 6 is a flowchart illustrating an example method for acquiring pedestal information based on some implementations of the disclosed technology.

FIG. 6 is a flowchart illustrating an example of a method for acquiring pedestal information based on some implementations of the disclosed technology.

Referring to FIG. 6, the image sensing device 100 may be included in one chip, and the respective operations S100-S150 shown in FIG. 6 may be performed in the process of testing the chip. In addition, each of the operations S100-S150 may be performed in a dark condition in which light is completely blocked.

This is because each of the operations S100~S150 corresponds to the operation for acquiring pedestal information (PI) that indicates the ratio between the dark current of the active pixel (AP) and the dark current of the optical black pixel (OBP) in a situation where the dark currents of the pixels AP and OBP are generated irrespective of light.

The test device (not shown) may generate a heating control signal corresponding to a set temperature (e.g., 60° C.), and may transmit the heating control signal to each of the first heating element (HE1) and the second heating element (HE2). Each of the first heating element (HE1) and the second heating element (HE2) may be heated to a set temperature corresponding to the heating control signal. The heated heating element (HE1) may reach a thermal equilibrium state in the same manner as the active pixels (AP), and the heated heating element (HE2) may reach a thermal equilibrium state in the same manner as the optical black pixels (OBP). Accordingly, the temperature of each of the active pixels (AP) may be identical to the set temperature, and the temperature of each of the optical black pixels (OBP) may be identical to the set temperature (S100).

Each of the active pixels (AP) of the active test block 330 having a set temperature may generate a pixel signal, and the pixel signal of each active pixel (AP) may be converted into a digital value after passing through the CDS 130, the ADC 140, and the output buffer 150. In some implementations, the active pixels (AP) may include red active pixels, green active pixels, and blue active pixels. In this case, the test device may calculate red active test data by calculating (e.g., calculating an average value) digital values corresponding to the red active pixels, may calculate green active test data by calculating (e.g., calculating an average value) digital values corresponding to the green active pixels, and may calculate blue active test data by calculating (e.g., calculating an average value) digital values corresponding to the blue active pixels.

Red active test data may refer to dark noise components caused by dark current generated in the red active pixels at a set temperature. Green active test data may refer to dark noise components caused by dark current generated in the green active pixels at a set temperature. Blue active test data may refer to dark noise components caused by dark current generated in the blue active pixels at a set temperature. In this case, the red active test data, the green active test data, and the blue active test data may be collectively referred to as first test data (S110).

Each of the optical black pixels (OBP) of the optical black test block 340 having a set temperature may generate a pixel signal, and the pixel signal of each active pixel (OBP) may be converted into a digital value after passing through the CDS 130, the ADC 140, and the output buffer 150. In some implementations, the optical black pixels (OBP) may include red optical black pixels, green optical black pixels, and blue optical black pixels. In this case, the test device may calculate red optical black test data by calculating (e.g., calculating an average value) digital values corresponding to the red optical black pixels, may calculate green optical black test data by calculating (e.g., calculating an average value) digital values corresponding to the green optical black pixels, and may calculate blue optical black test data by calculating (e.g., calculating an average value) digital values corresponding to the blue optical black pixels.

Red optical black test data may refer to dark noise components caused by dark current generated in the red optical black pixels at a set temperature. Green optical black test data may refer to dark noise components caused by dark current generated in the green optical black pixels at a set temperature. Blue optical black test data may refer to dark noise components caused by dark current generated in the blue optical black pixels at a set temperature. In this case, the red optical black test data, the green optical black test data, and the blue optical black test data may be collectively referred to as second test data (S120).

The test device may generate pedestal information (PI) for the set temperature based on the first test data and the second test data (S130). Therefore, the pedestal information (PI) may refer to information related to the pixel signals of the active pixels (AP) and the pixel signals of the optical black pixels (OBP).

In some implementations, the test device may determine a specific value obtained when red active test data of the first test data is divided by red optical black test data of the second test data to be a red pedestal correction value for the set temperature. In other words, the red pedestal correction value for the set temperature may refer to the ratio between the dark noise components caused by dark current of the red active pixel at the set temperature and the dark noise components caused by dark current of the red optical black pixel at the set temperature.

In addition, the test device may determine a specific value obtained when green active test data of the first test data is divided by green optical black test data of the second test data to be a green pedestal correction value for the set temperature. In other words, the green pedestal correction value for the set temperature may refer to the ratio between the dark noise components caused by dark current of the green active pixel at the set temperature and the dark noise components caused by dark current of the green optical black pixel at the set temperature.

In some implementations, the test device may determine a specific value obtained when blue active test data of the first test data is divided by blue optical black test data of the second test data to be a blue pedestal correction value for the set temperature. In other words, the blue pedestal correction value for the set temperature may refer to the ratio between the dark noise components caused by dark current of the blue active pixel at the set temperature and the dark noise components caused by dark current of the blue optical black pixel at the set temperature.

The test device may allow pedestal information (PI) including all of a red pedestal correction value, a green pedestal correction value, and a blue pedestal correction value to be matched to the set temperature, and may thus store the resultant pedestal information (PI) matched to the set temperature in the pedestal information storage 190 (S140).

The test device may change the set temperature (e.g., 60°) to a new set temperature (e.g., 61° C.) (S150), and may perform the operations S110-S140 for acquiring and storing pedestal information (PI) corresponding to the changed set temperature (e.g., 61° C.). In this case, the operation of changing the set temperature (e.g., the operation of increasing the set temperature) may refer to an operation of changing the heating control signal (e.g., the operation of increasing a voltage difference).

In addition, the test device may repeatedly perform the operations S110-S140 for acquiring and storing pedestal information (PI) corresponding to the set temperature, until pedestal information (PI) corresponding to each of the temperatures required for pedestal correction is obtained and stored. The plurality of temperatures may be determined at intervals of a preset temperature within an arbitrary temperature range (e.g., 40° C.-100° C.) or may be determined randomly within the arbitrary temperature range (e.g., 40° C.-100° C.).

When the operations shown in FIG. 6 are completed, pedestal information (PI) corresponding to each of the temperatures required for pedestal correction may be stored in the pedestal information storage 190.

In addition, although FIG. 6 illustrates that each of the operations S100 to S140 is performed only once at a specific temperature, other implementations are also possible, and it should be noted that each of the operations S100 to S140 can also be performed several times at each temperature required for pedestal correction so as to increase pedestal information (PI) accuracy.

Figure 7:
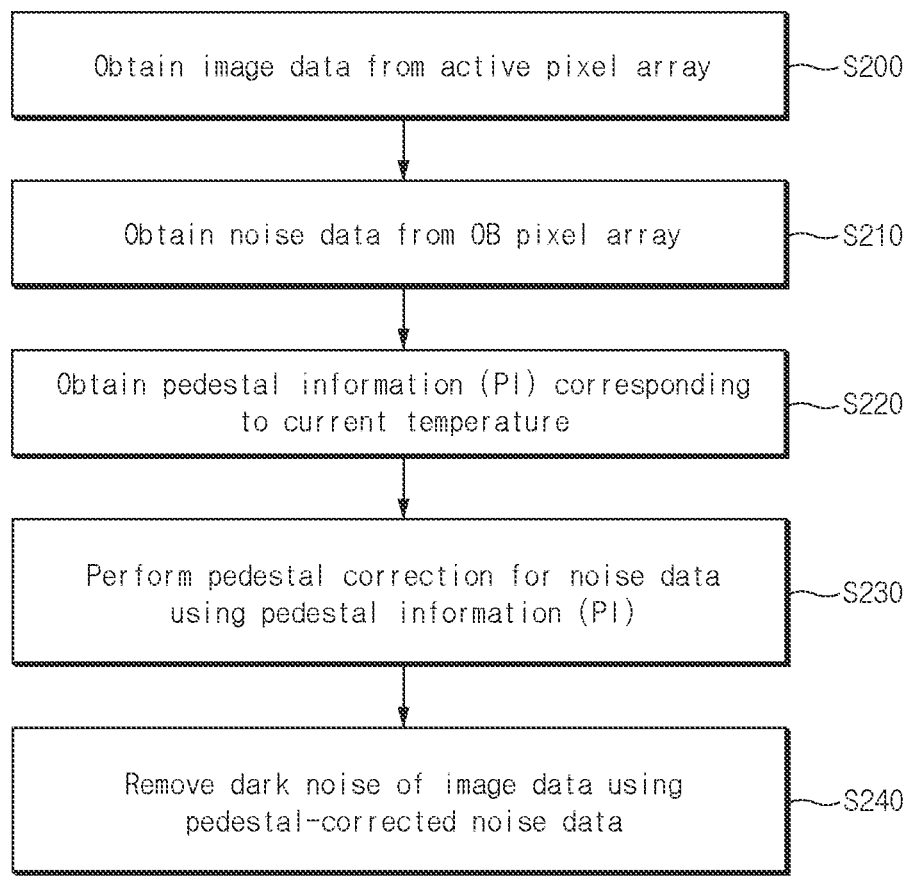
FIG. 7 is a flowchart illustrating an example method for performing pedestal correction using pedestal information based on some implementations of the disclosed technology.

FIG. 7 is a flowchart illustrating an example of a method for performing pedestal correction using pedestal information (PI) based on some implementations of the disclosed technology.

A method for forming a scene image captured by the imaging device 100 having the image sensing device 100 that has performed the testing operation of FIG. 6 will hereinafter be described with reference to FIG. 7.

The image signal processor 200 may generate a sensor control signal (SCS) requesting image formation, and may transmit the sensor control signal (SCS) to the image sensing device 100. The timing controller 170 of the image sensing device 100 having received the sensor control signal (SCS) may drive each of the active pixel array 310 and the optical black pixel array 320, thereby generating image data (IDATA) and noise data (NDATA). The image signal processor 200 may acquire the image data (IDATA) from the image sensing device 100 (S200), and may acquire the noise data (NDATA) from the image sensing device 100 (S210).

The image signal processor 200 may generate the sensor control signal (SCS) requesting pedestal information (PI), and may transmit the generated sensor control signal (SCS) to the image sensing device 100. The timing controller 170 of the image sensing device 100 having received the sensor control signal (SCS) may control the temperature sensor 180 to obtain a current temperature of the substrate where the pixel array 110 is formed.

The temperature sensor 180 may measure the temperature for each of the plurality of locations placed in the substrate where the pixel array 110 is formed, and may determine an average value of the measured temperatures to be a current temperature. The temperature sensor 180 may measure the temperature of at least one of the active pixel array 310 and the optical black pixel array 320, and may thus determine a current temperature based on the measured temperature.

In some implementations, the sensor control signal (SCS) for requesting pedestal information (PI) may be identical to or different from the sensor control signal (SCS) for requesting image generation.

The timing controller 170 may read out pedestal information (PI) corresponding to the current temperature from the pedestal information storage 190, by referring to information stored in the pedestal information storage 190 configured to store pedestal information (PI) corresponding to each of the plurality of temperatures. The image signal processor 200 may obtain pedestal information (PI) corresponding to the current temperature from the image sensing device 100 (S220). In some implementations, the pedestal information (PI) may include a red pedestal correction value, a green pedestal correction value, and a blue pedestal correction value.

In this case, the pedestal information (PI) corresponding to the current temperature may refer to pedestal information (PI) that corresponds to a temperature which is equal to or closest to the current temperature from among the plurality of temperatures.

The pedestal correction unit 210 of the image signal processor 200 may calculate a pedestal correction value (e.g., a red pedestal correction value) corresponding to the same color (e.g., red) with respect to the noise data (NDATA) corresponding to a specific color (e.g., red), and may perform pedestal correction for correcting the noise data (NDATA) in a manner that the corrected noise data (NDATA) is adjusted to a data level equivalent to the dark noise components of the image data (IDATA) (S230). For example, the operation may refer to an operation for multiplying the pedestal correction value by the noise data (NDATA), and other implementations are also possible.

The noise removal unit 220 of the image signal processor 200 may receive pedestal-corrected noise data for each color from the pedestal correction unit 210, may calculate pedestal-corrected noise data corresponding to the same color (e.g., red) as the image data (IDATA) corresponding to a specific color (e.g., red), and may remove dark noise components of the image data (IDATA) based on the calculated pedestal-corrected noise data (S240). Here, the operation may refer to an operation for subtracting pedestal-corrected noise data from the image data (IDATA), and other implementations are also possible.

The imaging device 10 based on some implementations of the disclosed technology may enable the chip (i.e., the image sensing device 100) to include the test block for generating pedestal information (PI), may store independent pedestal information (PI) for each chip, and may perform pedestal correction using the stored pedestal information (PI). As a result, the imaging device 10 can more accurately remove dark noise components included in the image data (IDATA).

In addition, the image sensing device 100 may store pedestal information (PI) for each subdivided temperature, and may perform pedestal correction using the stored pedestal information (PI), so that the image sensing device 100 can more accurately remove dark noise components included in the image data (IDATA).

As is apparent from the above description, the image sensing device based on some implementations of the disclosed technology may include a test block for generating pedestal information, allowing each image sensor semiconductor chip to store independent pedestal information to perform pedestal correction on a chip basis. In this way, dark noise components included in image data can be more accurately reflected in the image correction.

Although a number of illustrative embodiments have been described, it should be understood that various modifications and enhancements of the disclosed embodiments and other embodiments can be devised based on what is described and/or illustrated in this patent document.

What is claimed is:

1. An image sensing device comprising:
a first test block including a plurality of first image sensing pixels structured to convert incident light carrying an image into a first pixel signal indicative of the image, and a first heating element structured to transmit heat to the first image sensing pixels;
a second test block including a plurality of second image sensing pixels that each include a light blocking structure to be shielded from receiving incident light to generate a second pixel signal without being directly exposed to the incident light, and a second heating element structured to transmit heat to the second image sensing pixels; and
a readout block configured to process the first pixel signal output from the first test block and the second pixel signal output from the second test block.

2. The image sensing device according to claim 1, further comprising:
an active pixel array disposed adjacent to the first test block and including a plurality of active image sensing pixels that each have structures corresponding to the first image sensing pixel; and
an optical black pixel array disposed adjacent to the second test block and including a plurality of optical black pixels that each have structures corresponding to the second image sensing pixel.

3. The image sensing device according to claim 2, wherein:
the readout block is configured to generate image data by processing a pixel signal output from the active pixel array, and to generate noise data by processing a pixel signal output from the optical black pixel array.

4. The image sensing device according to claim 3, further comprising:
a pedestal information storage circuit configured to store pedestal information for correcting the noise data so that the corrected noise data indicates dark noise components of the image data.

5. The image sensing device according to claim 4, wherein:
the pedestal information storage circuit is configured to store the pedestal information corresponding to each of a plurality of temperatures.

6. The image sensing device according to claim 4, wherein:
the pedestal information includes a pedestal correction value corresponding to each color of color filters of the first image sensing pixels in the first test block.

7. The image sensing device according to claim 6, wherein:
the color filters include a red color filter, a green color filter, and a blue color filter.

8. The image sensing device according to claim 4, wherein:
the pedestal information is generated based on the first pixel signal of each of the first image sensing pixels included in the first test block and the second pixel signal of each of the second image sensing pixels included in the second test block.

9. The image sensing device according to claim 4, further comprising:
a temperature sensor configured to: measure a temperature of at least one of the active pixel array and the optical black pixel array; and determine a current temperature based on the measured temperature.

10. The image sensing device according to claim 9, further comprising:
a timing controller configured to read out the pedestal information corresponding to the current temperature from the pedestal information storage circuit.

11. The image sensing device according to claim 1, wherein:
the first heating element is disposed to surround the first image sensing pixels of the first test block.

12. The image sensing device according to claim 1, wherein:
the second heating element is disposed to surround the second image sensing pixels of the second test block.

13. The image sensing device according to claim 1, wherein:
each of the first heating element and the second heating element is disposed in a substrate that includes photoelectric conversion regions of the first image sensing pixels and photoelectric conversion regions of the second image sensing pixels.

14. The image sensing device according to claim 1, wherein:
each of the first heating element and the second heating element includes a thermoelectric element.

15. An imaging device comprising:
an image sensing device including a plurality of active image sensing pixels structured to convert incident light carrying an image into image data indicative of the image and a plurality of optical black pixels shielded from the incident light to generate noise data indicative of noise in the image data; and
an image signal processor configured to: correct the noise data using pedestal information corresponding to a temperature of the image sensing device; and subtract the corrected noise data from the image data,
wherein the image sensing device includes:
a first test block including a plurality of first image sensing pixels structured to convert the incident light carrying the image into a first pixel signal indicative of the image, and a first heating element structured to transmit heat to the first image sensing pixels;
a second test block including a plurality of second image sensing pixels that includes a light blocking structure to be shielded from receiving the incident light to generate a second pixel signal without being directly exposed to the incident light, and a second heating element structured to transmit heat to the second image sensing pixels; and
a pedestal information storage circuit configured to store the pedestal information related to the first pixel signal of the first image sensing pixels and the second pixel signal of the second image sensing pixels.

16. The imaging device according to claim 15, wherein the pedestal information storage circuit stores the pedestal information corresponding to each of a plurality of temperatures.

17. The imaging device according to claim 15, wherein the pedestal information includes a pedestal correction value corresponding to each color of color filters of the first image sensing pixels.

18. The imaging device according to claim 15, wherein the pedestal information is generated based on the first pixel signal of each of the first image sensing pixels included in the first test block and the second pixel signal of each of the second image sensing pixels included in the second test block.

19. The imaging device according to claim 15, wherein:
the first heating element is disposed to surround the first image sensing pixels of the first test block.

20. The imaging device according to claim 15, wherein:
the second heating element is disposed to surround the second image sensing pixels of the second test block.

\* \* \* \* \*